May 9, 1933.  M. R. WOLFARD  1,907,927
SUSPENSION MECHANISM
Filed March 3, 1927  3 Sheets-Sheet 1
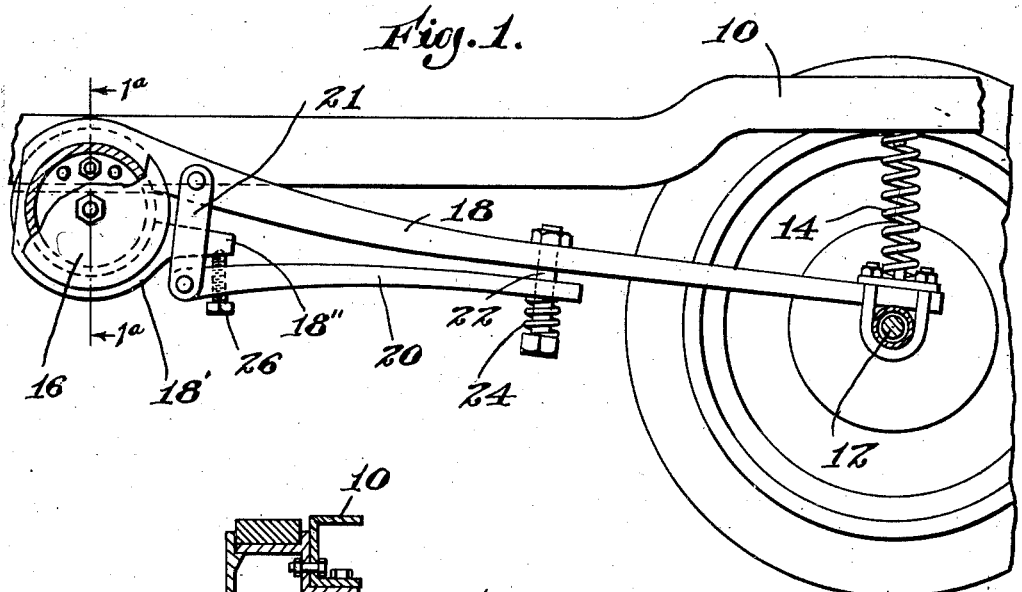
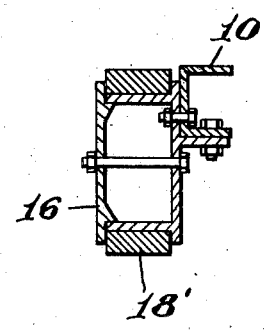
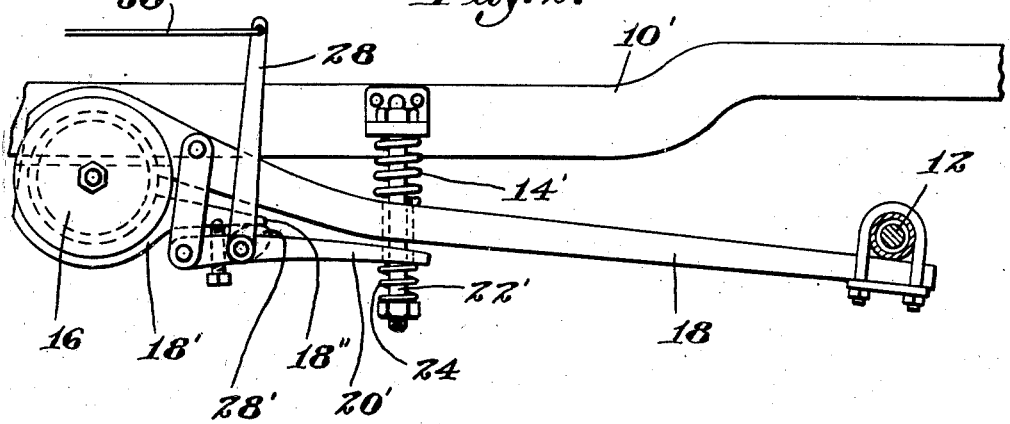
Inventor
Merl R. Wolfard
by Mitchell, Chadwick & Kent
Attorneys

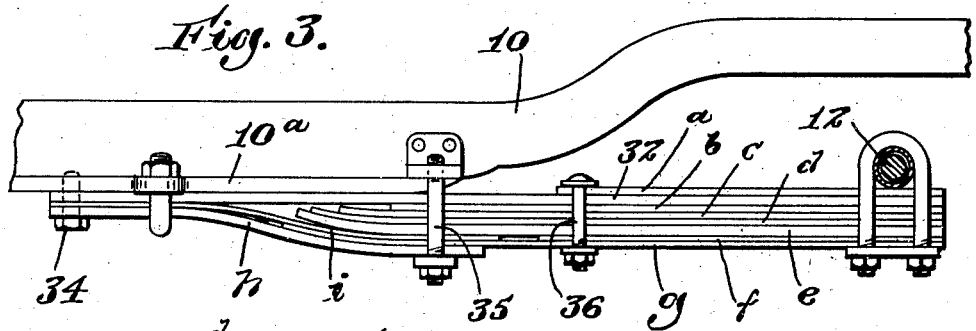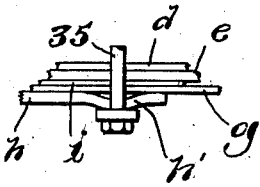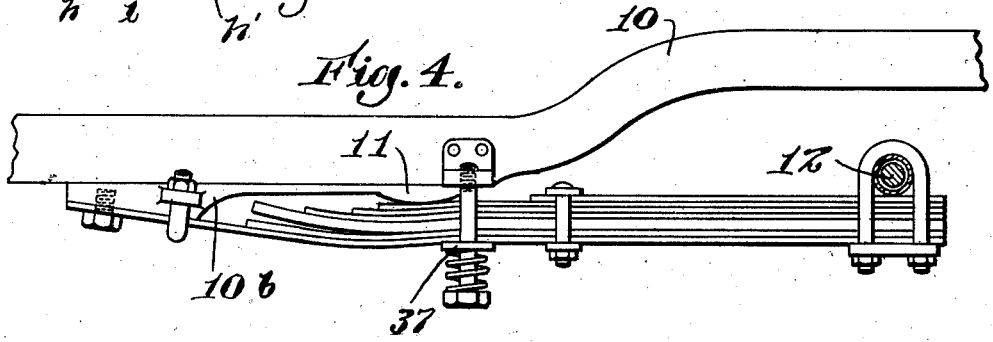

May 9, 1933.   M. R. WOLFARD   1,907,927
SUSPENSION MECHANISM
Filed March 3, 1927   3 Sheets-Sheet 3

Inventor
Merl R. Wolfard
by Mitchell, Chadwick & Kent
Attorneys

UNITED STATES PATENT OFFICE

MERL R. WOLFARD, OF CAMBRIDGE, MASSACHUSETTS

SUSPENSION MECHANISM

Application filed March 3, 1927. Serial No. 172,432.

This invention relates to improvements in suspension mechanisms. More especially it relates to a novel type of suspension mechanism in which a relatively large inelastic yielding resistance is combined in a positive and definite manner with an elastic element which is capable of yielding through a wide range without great increase in its stiffness. The invention is particularly adapted for supporting the bodies of vehicles and, when so used, will produce for the supported body a freedom from vibration and a riding comfort heretofore unapproached. It has a broader scope, however, in that it may be employed advantageously whenever and wherever it is desired that there be a minimum of vibration or transmitted shock in a body supported by another which is subject to shock. One example would be for mounting vibrating machines to prevent transmission of vibration or shock therefrom to the building.

When interposed between a carrying and a carried member, it is particularly an object to reduce to a minimum the shock or vibration or both which is transmitted from one to the other of the members when applied forces tend to move the one abruptly toward or from the other. In its application to vehicles, other objects or advantages are, to permit the carrying of a given load with less weight of chassis and vehicle body than heretofore required, with consequent reduction in the initial and maintenance costs, and in power and operating costs; to ensure greater safety when traveling over rough roads, and to permit higher speeds without tendency for the car to leave the road; to prolong the useful life of a vehicle, and of the engine, in motor driven vehicles; to prevent virbations of the engine from being transmitted to the vehicle body; to avoid loss or damage to merchandise carried, and discomfort to passengers, from shock or vibration; in automobile busses to eliminate vibrations which at present practically prevent passengers from reading and writing; and in railway and tram cars to provide smoother riding over the ordinary road bed, and particularly over a rough road bed, with a prolongation of life of the rails. In general, the invention provides for mollifying the motions of a body which is carried yieldingly, as on elastic supports, in a system that is subject to shocks in the direction of yielding.

These objects are attained by embodying, in the suspension mechanism, means for producing friction which co-operates with the suspending spring so as to absorb during a single flexure of the spring the whole or the greater part of the displacing energy applied by each road irregularity.

The invention provides for the reception of road impacts with comfortable sensation and with minimum shock and/or vibration by providing a new relation between inelastic absorption and dissipation of energy by said friction and elastic absorption of energy by the spring. I have discovered that mechanism interposed between a carrying and a carried member can make this relation fairly definite at every position which the carrying and the carried members may assume relative to each other; and that to produce the best results there are limits from which this relationship should not depart.

The invention will be described as it may be applied between the axle and the body of a road vehicle. In this connection, the term "static load" or "sprung load" or "body" herein signifies the vehicle frame, body, and contents carried by the suspension device of the invention; while the "unsprung load" or "axle" is the wheel, axle and other parts which normally rest on the ground without support by the suspension device of the invention. The said inelastic absorption and dissipation of energy is provided for by means of frictional resistance incorporated in the mechanism so as to oppose movement of the spring in each direction with such a strength relative to the load-carrying capacity of the spring that a "static zone" is produced, covering a vertical range commensurate with the amplitude of the road irregularities whose shocks are to be absorbed without resulting vibration of the load. A position therein, herein called the "normal static position", is that which the body would occupy relative to the axle if the spring (without the friction) were at such a stage of flexure that its stiffness was just sufficient to carry the static load. For illustration, assume that the frictional resistance is maintained constant and of such a magnitude as to require a force equal to 30% of the static load to overcome it in order to move the body in either direction. Then in a case where the static load on an axle is 2000 pounds and the frictional resistance 600 pounds, the body may be slowly depressed from normal static position until the stiffness or uplift of the springs has become 2600 pounds, and when released the body will remain at the depressed level, because the spring lift of 2600 pounds does not exceed the sum of the friction load of 600 pounds and the static load of 2000 pounds. Again, if the body be lifted slowly and the spring unflexed until the stiffness of the spring is so reduced as to be able to support only 1400 pounds, then the frictional resistance of 600 pounds added to this will maintain the 2000 pound body in that higher position. The vertical distance between these two limiting positions is what I term the "static zone." Within this zone, when the car is standing still, the body will remain at any elevation at which it may be put. The body may conveniently be said to be "lower" in the static zone when it is nearer to the axle, whether its approach be occasioned by its own movement downward or by movement of the axle upward. When in operation over a road, the position of the body in the static zone will vary according as road irregularities are encountered. As lifts and drops usually occur in alternation, there will be a "normal operating position" where the body will usually be found, which my tests show is substantially above the normal static position.

The encountering of an abrupt road elevation, as an upstanding stone, elevates the wheel and axle and so lifts the under side of the vehicle spring. Springs as heretofore constructed on automobiles, which are stiff enough unaided to keep the body in a satisfactory operating position, are so stiff that there is instantly a strong upward thrust against the car body, which starts the body moving upward simultaneously with the flexing of the spring, and this upward body motion is accelerated and continued by the reflex action of the spring which immediately follows. The total of energy thus applied to the car body is very large in comparison with that transmitted to a car body equipped with spring suspensions embodying the present invention, in which the spring is much lighter and the frictional resistance sustains a substantial part of the body weight. The relation of spring stiffness and friction, is such that the axle is permitted to pass more easily over a road lift, with the effect that in many instances the level of the body would be but little changed, and the axle would be raised to closer proximity to the body, there to remain until forced back at the next drop in the road, often instantly following, as when the wheel passes up and down over a paving block higher than its neighbors.

The unsprung weight has much less mass than the sprung weight. When the wheels move over a minor road depression, or pass from an eminence, the springs shoot the axle down by reacting against the body, which therefore remains near its former level; and the conditions in the static zone then hold the spring thus expanded until some other impulse makes further change. Consequently, when a road irregularity is encountered whose magnitude is not greater than about half the height of the static zone, the body moves but little, the axle is forced to a different level, up or down with respect to the body; and the friction drag then is effective to prevent the resulting superiority of spring, or of body weight, as the case may be, from reacting to produce vibration.

The presence of these frictional arrangements permits the springs to be designed of a different order of stiffness from that which has prevailed heretofore. The spring resistance to rise of the axle should be as little as is compatible with maintaining the body in proper relation to the axle under running conditions with the aid of the friction. In the preferred structure a lever-like element permits the locating of the friction means relative to the center of gravity of the load carried, irrespective of the location of the axle, in such manner as to reduce the energy transmitted in the direction of lifting the body, or, in other words, the location of the friction means reduces the rate of acceleration imparted to the body as compared with what that rate would be if the friction means were placed directly between the axle and body. The phrase "lever-like" is used because while this element may be entirely rigid, as a lever is theoretically, or may be rigid for only a considerable portion of its length, at one end, the remainder being elastically flexible, yet in every case its action is that of a lever in so far as the reaction about the fulcrum is concerned. Inasmuch as the frictional resistance at all times opposes the compression of the spring and also opposes the expanding reaction of the spring which follows, it is constantly absorbing and dissipating the energy of any shock which is being transmitted toward the body. It is preferred to design the parts so that usually all of the energy received from the upward drive of a road eminence of ordinary magnitude is thus absorbed in a single one-way movement within the static zone, that is, within the first beat of an oscillation. Energy received from the drop immediately beyond such an eminence then causes an equal and opposite movement, still within the static zone. When the energy of the displacing shock is so great as to drive the body out of the static zone, the body will be returned thereto; by the spring if the body has been driven below the zone, or by its own weight if driven above; but in each case the displacing energy continues to be absorbed and dissipated, according to the predetermined rate of operation of the friction device which rate preferably should be such as to bring the body to rest, relative to the axle, somewhere within the static zone, during the second beat of a complete oscillation.

Mechanism embodying the invention may be simple, involving springs and friction devices of many suitable types. The invention provides for the friction devices to be combined with the mountings of the springs, or for the friction to arise between different parts of a single complete spring; and the friction can be made automatically to be different in different parts of the body travel, as for example to become less with approach to the lower limit of the static zone, or with increasing flexure of the spring. Or it can be varied under control of the driver, according to the load.

As a result, under ordinary conditions, the body will not move up and down to any considerable extent and even with the most severe road roughnesses, cannot be made to vibrate, because all displacing energy is absorbed during a single oscillation.

As the invention has a broad scope it should be understood that the embodiments herein described merely illustrate some of the numerous applications of which the invention is capable. It is intended that the patent shall cover by suitable expression in the appended claims whatever features of patentable novelty exist in the invention disclosed.

In the accompanying drawings:

Figure 1 is a side elevation of a lever type suspension mechanism embodying the invention as it may be applied to automobiles, the spring element being of the coil type and the friction producing means being a brake drum and band arranged and controlled so as to maintain the friction constant;

Fig. 1ᵃ is an elevation in section on line 1ᵃ—1ᵃ of Figure 1;

Figure 2 is a view similar to Figure 1 of a modified apparatus having means for automatically varying the amount of friction as changes occur in the relative position of body and axle, and with means for adjusting the friction from the driver's seat;

Figure 3 is a side elevation illustrating the invention as it may be embodied in a lever-like leaf spring, the friction varying automatically with changes in the relative position of body and axle, and including means for quickly stiffening the spring when it is flexed beyond a predetermined point;

Figure 5:
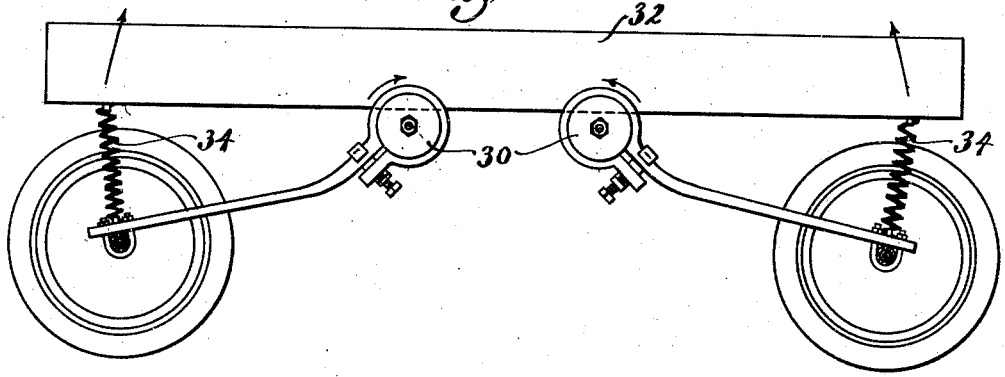
Figure 6:
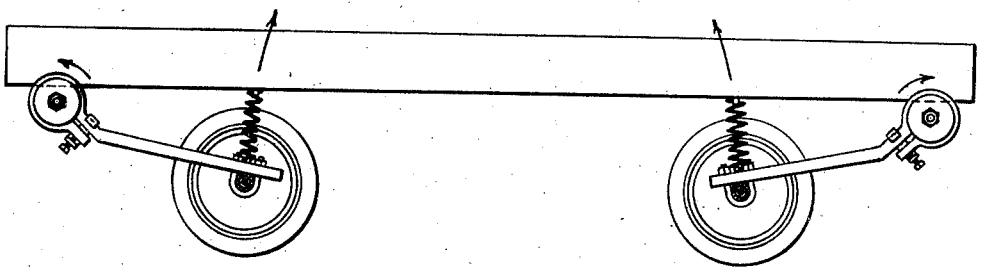

Figure 3ᵃ is a detail of a fragment of the spring seen in Figure 3, illustrating the bowed end portion of the lowest leaf before being clamped in place;

Figure 4 is a view similar to Figure 3 illustrating a modified form of spring in which a coil spring clamp is employed to gain the desired friction, and including means for quickly stiffening the spring when it is flexed beyond a predetermined point;

Figure 5 is a diagrammatic view illustrating for one embodiment of the invention, the incidence and effect of forces applied by road shocks to the body of a vehicle, when the lever-like elements extend toward the centre of the vehicle;

Figure 6 is a similar view of another embodiment applying the same principles but with a reverse arrangement of parts, the lever-like elements extending forward and rearward from axles relatively near the centre of the vehicle body.

The several views illustrate various forms of spring suspension mechanism interposed between the chassis 10 and the rear axle 12 of an automobile. In Figures 1 and 2 the vehicle springs are diagrammatically represented as coil springs 14 and 14′ which constitute the elastic shock-absorbing elements, and a brake-drum 16 produces the inelastic shock absorbing agent, friction. The brake-drum may be attached in any suitable and secure manner to the chassis 10, and its brake band is moved about it by movements of the axle relative to the chassis. For this, lever-like rocker arm 18, which in this instance is substantially rigid throughout its length, has one end formed as a clamp 18′ which passes around the brake-drum 16 as a brake band, and has its other end secured to axle 12. The clamp 18′ is manually adjustable to vary the friction at brake-drum 16; and when once adjusted the friction will be constant under changing load conditions. For this purpose, in Figure 1, a lever 20 has a link 21 fulcrum connection at its end near the brake drum, with the arm 18; and it lies along beside that arm for a distance to where a bolt 22 passes through them both, on which bolt is a coil spring 24 and a nut for pressing this end of the lever 20 toward arm 18, thus to operate and maintain constant pressure of a contact, shown as screw 26, against the lip 18″ of the clamp 18′. With this structure the intensity of friction arising at the brake-drum 16 may be readily adjusted and will remain constant as the axle moves relative to the chassis.

In Figure 2 provision is made for automatic variation of the friction as changes occur in the relation of chassis and axle. The vehicle spring 14′ in this arrangement is interposed between the chassis and arm 18 at a point as near to the brake-drum 16 as is practicable, thereby to provide for large movement at the axle end of the lever arm with little increase in the stiffness of the vehicle spring 14'. A longer bolt 22' in this case extends through the chassis and coil spring 14', and through arm 18, lever 20' and coil spring 24 as in Figure 1. The friction may be manually adjusted as in Figure 1; and it will automatically decrease as the axle and chassis approach each other, and increase as they separate, for with their approach spring 24 is relieved of compression and the clamping action at the brake-drum is correspondingly diminished. Other means may be provided for adjusting the friction from the driver's seat. For this purpose a rocker-lever 28 may be pivoted on arm 20', with a cam head 28' for engaging lip 18" to increase the friction at brake drum 16. A rod 30 secured to the other arm of the rocker-lever may extend to any convenient position to be manipulated by the driver.

The structures shown in Figures 3 and 4 are preferred commercial forms of improved spring suspension mechanisms. Here a lever-like rocker arm is built up with a plurality of leaves and may be conveniently made to permit relatively large movement of an automobile axle with little increase in the stiffness of the spring. Referring more particularly to Figure 3 the spring consists of a relatively heavy master leaf 32, auxiliary leaves $a$, $b$, $c$, $d$, $e$, $f$ and $g$, all clamped to axle 12 with one end, assumed to be the rear end, of the master leaf, and extending forward, and two friction leaves $h$, $i$, secured with the forward end of the master leaf as at 34 to a chassis plate $10^a$ and extending rearward.

A clamp 35 depends from the chassis and all of the leaves except $a$ and $f$ pass through it and are thereby held tight against each other, with the master leaf lying flat against plate $10^a$ forward of the clamp. Forces to and from the chassis are transmitted to the spring through plate $10^a$ just forward of clamp 35, the portion of the spring rearward of the clamp 36 being, by the clamping together of the plurality of leaves, converted into a substantially rigid lever-like rocker arm extending to the axle 12. This permits large movement of the axle to correspond to small movement at the point of spring flexure.

All of the leaves may be of the same thickness, but I prefer to make leaves $a$, $b$, $c$, $d$ and $g$ each two thirds the thickness of the several leaves 32, $e$ and $h$; and to make leaves $i$ and $f$ each one half the thickness of each of the latter leaves. Leaves $b$, $c$, $d$ and $g$ extend forward through clamp 35, with progressive increase in length, $b$ being the shorter of them and terminating just beyond said clamp. Leaf $g$ extends in a like direction and to an equal extent as leaf $e$. The friction leaves extend rearward, $i$ an appreciable distance beyond clamp 35 and $h$ ending just beyond the clamp. Leaf $f$ is merely a spacing leaf, terminating short of the rear end of friction leaf $i$; and leaf $a$ serves to hold a second clamp 36, to which it is secured, against sliding movement along the spring and also stiffens the projecting portion of the spring as a whole.

Whenever any leaf is flexed there is friction of each leaf on its neighbors, considerably more than in springs heretofore constructed. In addition to their load carrying function in supporting the downward thrust from the leaves above, leaves $h$ and $i$ are inserted in a manner adapted for making friction and they are arranged extending from their fastenings in opposite direction to the other leaves, because there is thus greater relative movement of the leaves when the spring flexes and consequently more friction resisting such flexure than would be the case if all of the leaves extended in a like direction. The relative movement which occurs between leaves in this region of the fulcrum clamp 35 is a sort of rotative slipping of one leaf over its neighbors, akin to the rotative slipping of band 18' on drum 16 in Figure 1. Additional means for increasing friction in the spring is provided, however, as may be best seen in Figure $3^a$. The lower leaf $h$ before being clamped in place, is bowed at the portion passing through clamp 35 indicated at $h'$; and, when clamped tight and somewhat flattened against the leaf above it as in Figure 3, exerts a pressure which tends to increase the friction between all of the leaves. In order that there shall not be too great increase of friction in the spring as a whole it is an important feature that the pressure exerted by the bowed leaf $h$ diminishes as the spring as a whole is flexed. If the axle of Figure 3 is depressed, the bowed end of leaf $h$ assumes more nearly its neutral or non-stressed position and consequently exerts less pressure upon the leaves above it; and the friction resulting from it becomes less.

Another feature of this spring construction is that the spring as a whole is stiffened as its flexure progresses. This result is gained by constructing leaf $e$ with its forward end curved upward. Under normal load conditions its curved portion is practically unstressed, standing spread away from friction leaf $i$ just below it, but as the body is depressed this leaf becomes more and more stressed and comes into service to stiffen the spring as a whole. This feature is important when below the lower limit of the static zone, at which position it may be desirable to increase the spring tension at a rapid rate.

The spring illustrated in Figure 4 embodies features and has a mode of operation like that shown in Figure 3. However, all of the leaves extend in the same direction, and the master leaf is the under one instead of the upper one. The required friction between the leaves is gained by a spring clamp 37 which presses the leaves tightly together, with the upper one engaging a slightly modified form of plate 10ᵇ. As the axle 12 rises in surmounting a road obstacle it bends the spring around the fulcrum 11 on the chassis plate 10ᵇ, increasing the tension of the suspension spring, but by its movement lessening the pressure of the clamp 37.

It should be understood that for clearness of illustration the thickness of the leaves is greatly exaggerated in the drawings, in proportion to the length of the springs.

When a length of the end portion of a group of leaves is tightly clamped, as the length between 36 and 12 in Figure 3, this portion acts as a stiff bar constituting an arm, whose movement acts like the arm of a lever in bending a part of the spring as at 35 which is remote from the place 12 where the power is applied. The up and down motion of the axle 12 is then considerable in extent relative to the flexure of the leaves at the place 35 where they bend; and therefore a movement through the whole static zone may occur without much change in stiffness. It should also be noted that the portion of the spring, where the group of leaves is tightly clamped together, acts as a true lever arm, in that when deflection occurs it forces the leaves which are above or below the master leaf to slide horizontally. That is, the anchored leaf acts as a fulcrum by means of which the lever arm produces horizontal movement of the leaves to create friction. The force acting horizontally is destroyed, i. e. is absorbed and dissipated, by friction, and it is deemed desirable to have this force as great as is feasible while keeping the vertical component which produces it as small as is feasible. It should be clear that the longer the lever the more nearly in this condition fulfilled. The general import of these last two statements applies also to the drum and band structure, for producing friction with the band attached to a lever-like rocker arm extending to the axle.

In case a drum and band are used for friction as in Figures 1 and 2, the drum may be of hard wear-resisting material and the band may be of softer material and capable of being readily replaced; and preferably materials which can be lubricated while still furnishing the needed friction should be chosen. It is not necessary to provide for the absorption of a great quantity of friction at this point, for the actual making of the spring less stiff over a wide range results in reduction of the displacing energy as compared with common practice when a wheel moves the axle toward the car body.

Figures 5 and 6 are diagrammatic representations illustrating the relation and effect of forces tending to displace a body supported by lever-like elements embodying the invention. Friction created at the drum 30 tends to pitch or rotate the body 32 in the direction of the small arrow about a centre which coincides with the centre of the drum, while forces acting on the body through spring 34, at the axle end of lever 36, tend to pitch the body 32 substantially in the direction of the large arrow rotating it about a centre different from the centre of the drum 30. In the case of a vehicle, the energy of a road bump is resolved thus into a force acting at the drum 30 and tending to rotate the body about the centre of the drum, and a force acting vertically through spring 34 and tending to rotate the body about another centre. Consequently, the relative location of these centres constitutes an important factor and may be determined in a particular case according to the length of body, wheel base desired, etc. In Figure 5 the resolved forces each tend to rotate the body in the same direction, while in Figure 6 the forces tend to rotate the body in opposite directions which is a desirable arrangement where the supported body is relatively long, as for example the body of a motor bus. The forces tending to pitch the body being opposed to each other, there results a minimum actual pitching of the body. The diagrammatic Figures 5 and 6 make clearer the presence of these distinctive and important features which may be obtained by the arrangement relative to the load carried of any of the structures illustrated in Figures 1-4 by which energy applied at the axle is resolved into two forces acting at different points on the supported body, one of which tends to move the body in a direction other than that in which the force acting vertically through the spring tends to move it; and to absorb by friction the first mentioned of these forces. It is important that the friction is utilized to gain greater height for the static zone without increasing the vertical force acting through the axle whenever a vertical movement is suddenly imparted to the axle.

The construction disclosed, operates, as one of its important features, in a novel manner, by utilizing the inertia of the vehicle body and its load so as to permit the absorption of a considerable portion of the energy of translation, upward or downward, of the unsprung weight, i. e. the energy of the axle and its rigidly attached parts, whenever these suddenly are impelled upward or downward. This best is illustrated in Figure 5. For purposes of explanation the body 32 may be assumed to have its load equally distributed throughout its length. Thus, under static conditions and disregarding for the moment the levers and drums 30, if this body be supported at two points near the ends of the body, or at any two positions which are equidistant from the ends toward the center, each support will carry one half of the total load. With freely resilient supports it is not possible to gain any appreciable advantage by placing either support nearer the center, as for example at the location of a drum 30 in Figure 5. This is due to the fact that, if the pitching of the body is to be held within substantially the same limits, the stiffness of the spring or other resilient support will need to be materially increased because of the greater mass which balances about the new point, with correspondingly greater inertia. However, if frictional energy absorbing means be introduced at the last mentioned point, where the inertia is greater, a larger amount of energy may be absorbed by friction with less upward accelerating effect on the body than would be possible were the friction means placed near the end of the body, where the opposing inertia is less.

The invention advantageously positions such friction means by employing a lever of considerable length actuated at a location near the end of the body, as at 34, to operate friction means located at a point nearer the center of the body, as at 30. This is a particularly useful arrangement in a vehicle because the resulting location of axles gives a long wheel base and permits the use of relatively light and flexible springs.

The increasing of friction as the body returns to normal operating position, from a depression of the load or from a raised position of the axle, has advantages over a constant friction arrangement, wherein the friction would increase with depression from normal running position. It allows the spring to exercise its strongest returning power when the load is farthest from its normal position, instead of being hampered by friction, at this critical position, where an increase of friction might prevent the spring from returning the load satisfactorily. Also, an important effect may result when this structure is applied at the front springs of a car. Such have customarily been made stiffer than the rear springs, but, by arranging for the extra friction of the invention to occur in the vicinity of the normal running position, vibrations made by the engine can be effectively absorbed by this friction. The front spring can then be made less stiff over a wide range; light enough to make riding in the car more comfortable. And in general, by providing for a reduction of friction as the body goes down toward the axle, it becomes possible to employ a lighter spring, because under those circumstances a less rapid increase in the stiffness of the spring can return the car to the static zone when momentarily displaced.

The operation of the invention may be illustrated by considering the action when an abrupt elevation or bump is encountered on a road. If the vehicle, when traveling at a fair rate of speed, with the body in normal operating position, encounters a bump whose height is less than one half of the vertical extent of the static zone, the wheel will thereby be forced up to the level of the top of the bump, raising the axle correspondingly; but the body will be raised only a very little, for the body has a heavy mass, and the effective mass or inertia load is increased by the preferred method of mounting, and the only energy transmitted to it is (a) that due to the friction and (b) that due to the stiffness of the spring, which is a force acting through the short distance through which the body is thus raised. But as the motion upward progresses the major portion of this energy is gradually consumed by the friction and what remains stored in the spring is insufficient to raise the body higher. No expanding reaction of the spring, recoiling from its compression will follow to drive the body higher. While the axle continues at the raised level the spring cannot expand back to the spread which it had before the encounter, for being still within the static zone, the stiffness of the spring is insufficient to overcome both the friction drag and the weight of the body. The spring therefore stays compressed; but immediately upon the wheel falling off from the bump the spring can expand downward, and it does so, forcing the wheel down to the road level. The energy that was stored in the spring acts with the weight of axle and wheels to overcome the friction during the descent of axle to its former level; and the body meanwhile does not approach the ground through any substantial distance because it is continuously supported by contact of the wheel with the ground, except for that very brief interval while the wheels may be flying through the air unsupported, during which period only the excess of gravity over and above the tension in the spring minus the friction load can start to pull the body down. The fall of the body can, therefore, be but small, because the expanding reaction of the spring against the body and upon the relatively lighter wheels and axle will force the wheels rapidly down to renewed contact with the road. The action is similar but reversed in sequence when a wheel comes to a depression in the road, the body then coming into position above the normal running position, as the wheel and axle shoot downward, and being restored to normal when the axle is thrust up again on encountering the further edge of the depression.

The energy which has been transmitted to the body, when a structure as commonly used heretofore has passed over a bump, is by the device of the invention, first, reduced as to its initial or total quantity of energy, because of the larger range in flexure of springs which can be used without great increase in stiffness; and, second, is completely or in large measure absorbed and dissipated without producing any rapid or uncomfortable rate of acceleration of the body; the larger percentage being consumed immediately, and the remaining smaller percentage being held in storage until the next opposite road shock is encountered.

The invention has been described and claimed primarily with reference to a horizontal plane of support, but its scope is such as to be appliable to any plane of support wherever it is desirable to support a carried member relative to a carrying member, which is subject to sudden movements or vibrations, in such manner as to prevent wholly, or in large measure these sudden movements or vibrations from being transmitted to said carried member. "Carried member" is used to denote specifically the member in which freedom from shock or vibration is particularly desired, and "carrying member" is used to denote specifically the member which is subject to sudden movement or vibration, irrespective of the relative positions which these members may assume as compared with any outside datum of reference.

For example, if the problem be to prevent vibration of a machine from being transmitted to the building the vibrating machine may be the "carrying member" and the building then becomes the "carried member." On the other hand, if the problem be to prevent vibration of a delicate scientific instrument in a power station, or a building near a source of heavy shocks, as a railway, the building becomes the "carrying member."

I claim as my invention:

1. Suspension mechanism for a carried member on a carrying member, comprising, in combination, a lever-like element having at least a considerable end portion of its length substantially rigid and connected to said carrying member, and having its other end portion connected to said carried member, there being elastic means holding the two said members yieldingly in spaced relation; and frictional resistance means near the lever-like element's connection to said carried member and controlled by said element, the location of said supporting connection to said carried member being at such a direction and distance, horizontally along the carried member from the location of the connection of said lever-like element to said carrying member, that the increase in acceleration to the carried member, through said frictional resistance means, consequent upon a sudden movement of the carrying member toward the carried member, will be small as compared with what the increase in said acceleration would be if said resistance means were positioned approximately over the connection of said lever-like element to said carrying member.

2. Suspension mechanism adapted to be interposed between an axle and the chassis of a vehicle, comprising, in combination, a lever-like element having at least a considerable end portion of its length substantially rigid and connected to said axle, and having its other end portion connected to the chassis, there being a spring, holding the said axle and chassis yieldingly in spaced relation, and there being frictional resistance means controlled by said lever-like element at its connection to the chassis; the whole being organized with the point on the carried member against which occurs the reaction for operating said resistance means located at such a distance from the axle in horizontal direction along the chassis that a sudden movement of the axle toward the chassis will impart to that portion of the chassis immediately over the axle a slower acceleration, in addition to that imparted by the resilient reaction of said spring, than would be imparted to the chassis if said point on the carried member against which reaction occurs were positioned approximately over the axle.

3. Suspension mechanism for a carried member on a carrying member, comprising, in combination, a lever-like element having at least a considerable end portion of its length substantially rigid and connected to said carrying member and extending in direction toward a mid-point along the carried member, and having its other end connected to said carried member, there being elastic means holding the two said members yieldingly in spaced relation; and frictional resistance means near the said element's connection to said carried member and controlled by said element, said connection to said carried member being positioned so that, whenever the carrying member moves rapidly toward the carried member, the inertia load of said carried member available to overcome frictional resistance is greatly increased as compared with what it would be if said frictional resistance means were positioned vertically over the connection of said lever-like element to said carrying member.

4. Suspension mechanism for a carried member on a carrying member, comprising in combination, a lever-like element, having at least a considerable end-portion of its length substantially rigid and connected to said carrying member and extending thence in direction toward a mid-point along the carried member; said element having its other end portion connected to said carried member; there being elastic means holding the two said members yieldingly in spaced relation; and frictional resistance means constituting the lever-like element's lifting connection to said carried member, positioned along the carried member at a location in a middle zone of the carried member where the force required to accelerate rapidly said carried member exceeds substantially the force which would be required to produce an equivalent acceleration thereof if the force were applied near one end of said carried member, and said frictional resistance being coordinated with the resilience of said elastic element in such a manner as to produce a static zone of substantial extent.

5. Suspension mechanism adapted to be interposed between an axle and the chassis of a vehicle, comprising in combination, a plural leaf spring having a considerable portion of its length substantially rigid, and a portion which is flexible; and frictional resistance means, associated with said flexible portion at the place of application of the weight of the chassis to the spring; said spring having its rigid portion secured to the axle and its other end secured to the chassis; said frictional resistance and the flexibility of said spring being positioned and coordinated relative to each other in such manner as to produce a static zone of substantial height.

6. Suspension mechanism for a carried member on a carrying member comprising, in combination, an elastic element whose resilient force opposes the carried member and tends yieldingly to restore it to position with a normal space between the two said members; and means to produce a static zone, said means comprising a frictional support spaced a substantial distance from said elastic element toward a mid-point along the carried member and organized for producing yielding inelastic resistance to movement of one said member relative to the other, and having a magnitude of inelastic resistance capable of overcoming at least the major part of the amount of change of said resilient force which corresponds to all ordinary operative displacement, of one said member relative to the other, whereby the remainder of resilient force which was engendered by the displacement from normal is insufficient to restore the members to said normal space position.

7. Suspension mechanism for a carried member on a carrying member comprising, in combination, an elastic element whose resilient force opposes the carried member and tends yieldingly to restore it to position with a normal space between the two said members; and means to produce a static zone, said means comprising a frictional support spaced a substantial distance from said elastic element toward a mid-point along the carried member and organized for producing yielding inelastic resistance to movement of one said member relative to the other, and having a magnitude of inelastic resistance capable of overcoming at least the major part of the amount of change of said resilient force which corresponds to all ordinary operative displacement of one said member relative to the other, whereby the remainder of resilient force which was engendered by the displacement from normal is insufficient to restore the members to said normal space position; the resilience of said elastic element and the spaced relation of the members being co-ordinated so that in a relatively large variation of said spaced relation there is a relatively small change of elastic resistance.

8. Suspension mechanism for a vehicle body on a supporting member, comprising, in combination, a spring whose resilient force opposes the vehicle body and tends yieldingly to restore it to position with a normal space between it and said supporting member; and means to produce a static zone approximating as much as two inches in vertical extent, said means comprising a frictional support arranged a substantial distance from the connection of spring to support toward a mid-point along the body and organized for producing yielding frictional resistance to relative movement of said body and said member; said frictional resistance exceeding the increase of resilience of said spring which is engendered by its yielding to any point within said zone.

9. Suspension mechanism for a carried member on a carrying member, comprising, in combination, a spring, tending to hold the two said members yieldingly in spaced relation, and adapted to flex through and beyond the herein described static zone; and frictional resistance means organized to oppose relative movement of the two said members toward or from each other, the said frictional resistance means being located at a distance from the carrying member toward a mid-point along the carried member and being applied to the carried member as a lifting means at said location toward the mid-point; said spring and said frictional resistance means being co-ordinated in such relation of position and magnitude, one to the other, that said static zone has an amplitude whose extent exceeds the amplitude of displacement to which the carrying member is ordinarily subject, the extent of said zone being defined by the distance between the position where the carried member, while free from oscillating forces, would come to rest if depressed and allowed to rise very slowly under the action of said spring only and the position where it would come to rest if elevated and allowed to descend very slowly under the retarding action of said frictional resistance means.

10. Suspension mechanism for a carried member on a carrying member, comprising, in combination, an elastic element tending to hold the two said members yieldingly in spaced relation; and frictional resistance means adapted to oppose relative movement of the two said members toward or from each other; said frictional resistance means being organized to restrain and modify the action of said elastic element so as to produce a static zone whose amplitude of effective action covers the mid-portion of the travel of said members toward and from each other, to an extent exceeding the amplitude of displacement ordinarily experienced by those members, the extent of said zone being defined by the distance between the position where the carried member, while free from oscillating forces, would come to rest if depressed and allowed to rise very slowly under the action of said elastic element only and the position where it would come to rest if elevated and allowed to descend very slowly under the retarding action of said frictional resistance means; and means associated with said elastic element adapted to increase rapidly the resistance of said elastic element beyond a limit of said static zone, comprising a resilient element associated with said elastic element, which resilient element comes into play beyond said limit of said static zone.

11. Suspension mechanism for a carried member on a carrying member, comprising, in combination, an elastic element tending to hold the two said members yieldingly in spaced relation; and frictional resistance means adapted to oppose relative movement of the two said members toward or from each other; said frictional means being organized to restrain and modify the action of said elastic element so as to produce a static zone of substantial extent, the extent of said zone being defined by the distance between the position where the carried member, while free from oscillating forces, would come to rest if depressed and allowed to rise very slowly under the action of said elastic element only and the position where it would come to rest if elevated and allowed to descend very slowly under the retarding action of said frictional resistance means; and means, associated with said frictional resistance means, for diminishing automatically the quantity of friction as said carried member moves from its normal position in a direction which causes increase of the resistance of said elastic element, comprising a pressure device associated with said frictional resistance means and arranged for diminution of its pressure with yielding of said elastic element.

12. Suspension mechanism adapted to be interposed between an axle and the chassis of a vehicle, comprising, in combination, a plural leaf spring having a considerable portion of its length which is substantially rigid and extends from the axle, and having a portion which is flexible; and frictional resistance means associated with said flexible portion; said means comprising resilient means clamping the leaves together and clamping them to the chassis with space between wherein this part of the spring may approach the chassis when flexing, whereby the said resilient means is adapted to diminish its pressure as the chassis is depressed; said spring having one end secured to the axle and its other end secured to the chassis; and the weight of the chassis being applied to the spring at the location of said frictional resistance means.

13. Suspension mechanism adapted to be interposed between an axle and the chassis of a vehicle, comprising in combination, a plural leaf spring having a considerable portion of its length which is substantially rigid and extends from said axle, and having a portion which is flexible; and frictional resistance means associated with said flexible portion; said spring having one end secured to the axle and its other end secured to the chassis, and having its flexible portion at the place of application of the weight of the chassis to the spring; one of said leaves having its end portion in proximity to another leaf but being normally in position for sustaining relatively little stress, and being organized to come more and more into stress by progressive increase of flexure of said other leaves with abnormal increase in spring flexure.

14. Suspension mechanism adapted to be interposed between an axle and the chassis of a vehicle, comprising in combination, a plural leaf spring having a considerable portion of its length which extends from the axle and is substantially rigid, and having a portion which is flexible near its connection with the chassis; and frictional resistance means pressing tightly together the leaves at said flexible portion; one of said leaves at the compressed flexible portion being arranged extending in opposite direction to that of an adjacent leaf, and having one end secured to the chassis, whereby a relatively large movement of the leaves with respect to each other is obtained when the spring flexes, with large friction surfaces and bearing surfaces.

Signed at Boston, Massachusetts, this second day of March, 1927.

MERL R. WOLFARD.

CERTIFICATE OF CORRECTION.

Patent No. 1,907,927. May 9, 1933.

MERL R. WOLFARD.

It is hereby certified that error appears in the printed specification of the above numbered patent requiring correction as follows: Page 1, line 40, for "virbations" read "vibrations"; page 3, line 102, after "this," insert the article "a"; page 5, line 41, for "in" read "is"; page 6, line 19, after "invention" insert "thus"; page 7, lines 42 and 96, claims 1 and 3 respectively, after "connected" insert "supportingly"; same page, line 109, claim 3, after "were" insert the words "operated by the reaction of the carried member at a point"; and that the said Letters Patent should be read with these corrections therein that the same may conform to the record of the case in the Patent Office.

Signed and sealed this 8th day of August, A. D. 1933.

M. J. Moore.

(Seal) Acting Commissioner of Patents.